US008868464B2

(12) United States Patent
Zhuk et al.

(10) Patent No.: US 8,868,464 B2
(45) Date of Patent: Oct. 21, 2014

(54) PREVENTING UNAUTHORIZED MODIFICATION OR SKIPPING OF VIEWING OF ADVERTISEMENTS WITHIN CONTENT

(75) Inventors: Oscar V. Zhuk, Bellevue, WA (US);
Glenn A. Morten, Bellevue, WA (US);
Edward Charles Hiar, Lynnwood, WA (US)

(73) Assignee: Google Inc., Mountain View, CA (US)

( * ) Notice: Subject to any disclaimer, the term of this patent is extended or adjusted under 35 U.S.C. 154(b) by 1546 days.

(21) Appl. No.: 12/027,839

(22) Filed: Feb. 7, 2008

(65) Prior Publication Data
US 2009/0204541 A1 Aug. 13, 2009

(51) Int. Cl.
*G06F 21/00* (2013.01)
*H04N 21/4405* (2011.01)
*H04N 21/266* (2011.01)
*H04N 7/167* (2011.01)
*H04N 21/2347* (2011.01)
*H04N 21/81* (2011.01)
*H04L 29/06* (2006.01)

(52) U.S. Cl.
CPC ..... *H04N 21/4405* (2013.01); *H04N 21/26613* (2013.01); *H04N 7/1675* (2013.01); *H04N 21/2347* (2013.01); *H04N 21/812* (2013.01); *H04L 63/0428* (2013.01)
USPC .......................................................... 705/51

(58) Field of Classification Search
USPC .............. 705/16, 21, 51, 59, 71; 380/44, 262, 380/278, 279
See application file for complete search history.

(56) References Cited

U.S. PATENT DOCUMENTS

| 4,535,355 | A | 8/1985 | Arn et al. |
| 4,694,489 | A | 9/1987 | Frederiksen |
| 5,067,035 | A | 11/1991 | Kudelski et al. |
| 5,134,656 | A | 7/1992 | Kudelski et al. |

(Continued)

FOREIGN PATENT DOCUMENTS

| EP | 0 852 445 A2 | 7/1998 |
| EP | 0 658 054 B1 | 9/1998 |

(Continued)

OTHER PUBLICATIONS

"Establishing Interconnectivity Among Various Makers' Products Through Standardization of VOD Protocol," NTT Corporation Press Release, 5 pages, Sep. 27, 2002, http://www.ntt.co.jp/news/news02e/0209/020927.html.

(Continued)

*Primary Examiner* — Dante Ravetti
(74) *Attorney, Agent, or Firm* — Fenwick & West LLP

(57) ABSTRACT

A method, apparatus, and system are directed towards employing a chain of permission keys obtained during playing of advertisements within content to enable continued playing of the content. A sequence of encoded permission keys are generated with each encoded permission key, except a last permission key, incorporating a scrambling key useable to decode a next encoded permission key within the sequence of encoded permission keys that enables playing of a next portion of the content. If playing of any advertisement within the content is avoided, then access to an associated scrambling key useable to decode a next permission key is prevented, which in turn inhibits playing of a next portion of the content. In another embodiment, a heartbeat analysis may also be performed to monitor if skipping of an advertisement is being attempted, and if so, playing of the content is prevented.

18 Claims, 7 Drawing Sheets

(56) References Cited

U.S. PATENT DOCUMENTS

| | | | |
|---|---|---|---|
| 5,144,663 A | 9/1992 | Kudelski et al. |
| 5,339,413 A | 8/1994 | Koval et al. |
| 5,375,168 A | 12/1994 | Kudelski et al. |
| 5,487,167 A | 1/1996 | Dinallo et al. |
| 5,539,450 A | 7/1996 | Handelman et al. |
| 5,590,200 A | 12/1996 | Nachman et al. |
| 5,592,212 A | 1/1997 | Handelman et al. |
| 5,613,002 A | 3/1997 | Kephart et al. |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies et al. |
| 5,920,861 A | 7/1999 | Hall et al. |
| 5,922,208 A | 7/1999 | Demmers et al. |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A | 11/1999 | Graunke et al. |
| 5,995,625 A | 11/1999 | Sudia et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt et al. |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria et al. |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelman et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,327,652 B1 | 12/2001 | England et al. |
| 6,334,213 B1 | 12/2001 | Li |
| 6,363,488 B1 | 3/2002 | Ginter et al. |
| 6,385,596 B1 | 5/2002 | Wiser et al. |
| 6,389,402 B1 | 5/2002 | Ginter et al. |
| 6,405,369 B1 | 6/2002 | Tsuria et al. |
| 6,409,080 B2 | 6/2002 | Kawagishi et al. |
| 6,409,089 B1 | 6/2002 | Eskicioglu |
| 6,415,031 B1 | 7/2002 | Colligan et al. |
| 6,427,140 B1 | 7/2002 | Ginter et al. |
| 6,438,692 B2 | 8/2002 | Kato et al. |
| 6,442,283 B1 | 8/2002 | Tewfik et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,560,339 B1 | 5/2003 | Iwamura et al. |
| 6,560,705 B1 | 5/2003 | Perlman et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,633,918 B2 | 10/2003 | Agarwal et al. |
| 6,634,028 B2 | 10/2003 | Handelman et al. |
| 6,640,304 B2 | 10/2003 | Ginter et al. |
| 6,651,170 B1 | 11/2003 | Rix et al. |
| 6,654,420 B1 | 11/2003 | Snook et al. |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,741,991 B2 | 5/2004 | Saito et al. |
| 6,792,113 B1 | 9/2004 | Ansell et al. |
| 6,834,346 B1 | 12/2004 | Ishibashi et al. |
| 6,886,098 B1 | 4/2005 | Benaloh |
| 6,912,512 B2 | 6/2005 | Miyazaki et al. |
| 6,963,972 B1 | 11/2005 | Chang et al. |
| 6,993,133 B1 | 1/2006 | Nonomura et al. |
| 7,007,170 B2 | 2/2006 | Morten |
| 7,024,563 B2 | 4/2006 | Shimosato et al. |
| 7,058,809 B2 | 6/2006 | White et al. |
| 7,111,167 B1 | 9/2006 | Yeung et al. |
| 7,120,251 B1 | 10/2006 | Kawada et al. |
| 7,240,196 B2 | 7/2007 | Cooper et al. |
| 7,328,345 B2 | 2/2008 | Morten et al. |
| 2001/0042043 A1 | 11/2001 | Shear et al. |
| 2001/0044780 A1 | 11/2001 | Miyazaki et al. |
| 2002/0001385 A1 | 1/2002 | Kawada et al. |
| 2002/0003880 A1 | 1/2002 | Kato et al. |
| 2002/0015494 A1 | 2/2002 | Nagai et al. |
| 2002/0015498 A1 | 2/2002 | Houlberg et al. |
| 2002/0021805 A1 | 2/2002 | Schumann et al. |
| 2002/0049679 A1 | 4/2002 | Russell et al. |
| 2002/0078178 A1 | 6/2002 | Senoh |
| 2002/0089410 A1 | 7/2002 | Janiak et al. |
| 2002/0095589 A1 | 7/2002 | Keech |
| 2002/0104004 A1 | 8/2002 | Couillard |
| 2002/0107803 A1 | 8/2002 | Lisanke et al. |
| 2002/0108037 A1 | 8/2002 | Baker |
| 2002/0141582 A1 | 10/2002 | Kocher et al. |
| 2002/0147923 A1 | 10/2002 | Dotan |
| 2002/0168082 A1 | 11/2002 | Razdan |
| 2002/0169963 A1 | 11/2002 | Seder et al. |
| 2003/0007568 A1 | 1/2003 | Hamery et al. |
| 2003/0033521 A1 | 2/2003 | Sahlbach |
| 2003/0033529 A1 | 2/2003 | Ratnakar et al. |
| 2003/0046568 A1 | 3/2003 | Riddick et al. |
| 2004/0003398 A1* | 1/2004 | Donian et al. ............... 725/34 |
| 2004/0117500 A1 | 6/2004 | Lindholm et al. |
| 2004/0151315 A1 | 8/2004 | Kim |
| 2004/0184616 A1 | 9/2004 | Morten |
| 2005/0193205 A1 | 9/2005 | Jacobs et al. |
| 2005/0257266 A1 | 11/2005 | Cook et al. |
| 2005/0273862 A1 | 12/2005 | Benaloh et al. |
| 2006/0021037 A1 | 1/2006 | Zhuk et al. |
| 2006/0101287 A1 | 5/2006 | Morten |
| 2006/0143481 A1 | 6/2006 | Morten |
| 2007/0169159 A1* | 7/2007 | Aaby et al. .................. 725/97 |

FOREIGN PATENT DOCUMENTS

| | | |
|---|---|---|
| EP | 0 886 409 A2 | 12/1998 |
| EP | 1 134 977 A1 | 9/2001 |
| EP | 0 714 204 B1 | 1/2002 |
| EP | 1 246 463 A2 | 10/2002 |
| WO | WO 96/06504 A1 | 2/1996 |
| WO | WO 96/32702 | 10/1996 |
| WO | WO 99/21364 A1 | 4/1999 |

(56) References Cited

FOREIGN PATENT DOCUMENTS

| WO | WO 99/28842 A1 | 6/1999 |
|---|---|---|
| WO | WO 99/30499 | 6/1999 |
| WO | WO 99/54453 | 10/1999 |
| WO | WO 01/35571 A1 | 5/2001 |
| WO | WO 01/93212 A2 | 12/2001 |
| WO | WO 02/21761 A2 | 3/2002 |
| WO | WO 04/002112 A1 | 12/2003 |

OTHER PUBLICATIONS

"Irdeto Access and Optibase Create Strategic Alliance," Optibase Press Release, 2 pages, Dec. 14, 2000, http://www.optibase.com/html/news/December_14_2000.html (accessed Nov. 13, 2003).

"Irdeto Access and Optibase Create Strategic Alliance," Irdeto Access Press Release, 4 pages, Dec. 14, 2000, http://www.irdetoaccess.com/press/0000041.htm.

Hunter, Jane et al., "A Review of Video Streaming Over the Internet," DSTC Technical Report TR97-10, Aug. 1997, 28 pages, http://archive.dstc.edu.au/RDU/staff/jane-hunter/video-streaming.html (accessed Dec. 2, 2003).

Eskicioglu, Ahmet M. et al., "An Overview of Multimedia Content Protection in Consumer Electronics Devices," 2000, 18 pages, http://citeseer.ist.psu.edu/cache/papers/cs/14065/ftp:zSzzSzskynet.ecn.purdue.eduzSzpubzSz distzSzdelpzSzei00-consumerzSzpaper.pdf/eskicioglu00overview.pdf.

Balthrop, Justin et al., "Coverage and Generalization in an Artificial Immune System," Proceedings of Genetic and Evolutionary Computation Conference (GECCO), 2002, 8 pages, http://www.cs.unm.edu/~judd/papers/generalization.pdf.

Blumenfield, Steven M., "Streaming Media: System Security," Broadcast Engineering, Oct. 2001, 2 pages.

Cheng, Howard et al., "Partial Encryption of Compressed Images and Videos," IEEE Transactions on Signal Processing, Aug. 2000, 48(8):2439-2451.

Cheng, Howard Chi Ho, "Partial Encryption for Image and Video Communication," (Master's Thesis) University of Alberta, 1998, 94 pages.

European Search Report dated Oct. 12, 2005, which issued in the prosecution of European Patent Application No. 05250968.4, 3 pages.

European Patent Office Action dated Jan. 26, 2006, which issued in the prosecution of European Patent Application No. 05250968.4, 7 pages.

European Supplementary Search Report dated Nov. 14, 2005, which issued in the prosecution of European Patent Application 00986215.2, 2 pages.

Eskicioglu, Ahmet M. et al., "An Overview of Multimedia Content Protection in Consumer electronics devices," Signal Processing: Image Communication, 2001,16:681-699.

Fairhurst, Gorry, "Manchester Encoding," Jan. 1, 2006, 2 pages, http://www.erg.abdn.ac.uk/users/gorry/course/phy-pages/man.html (accessed Jun. 13, 2006).

Fairhurst, Gorry, "Non-Return to Zero (NRZ) Encoding," 1 page, Jan. 10, 2001, http://www.erg.abdn.ac.uk/users/gorry/course/phy-pages/nrz.html (accessed Jun. 13, 2006).

Ferrill, Elizabeth et al., "A Survey of Digital Watermarking," Feb. 25, 1999, 15 pages, http://www.elizabeth.ferrill.com/papers/watermarking.pdf.

Forrest, Stephanie, "Research Projects," University of New Mexico, 3 pages, http://www.cs.unm.edu/~forrest/projects.html (accessed Dec. 2, 2003).

Friedman, Menahem et al., *Introduction to Pattern Recognition: Statistical, Structural, Neural and Fuzzy Logic Approaches*, World Scientific Publishing Company, Dec. 1999, p. 4.

Goodman, James et al., "Low Power Scalable Encryption for Wireless Systems," Wireless Networks,1998, 4:55-70.

Goonatilake, S., ed. et al., *Intelligent Systems for Finance and Business*, John Wiley & Sons Ltd,1995, chapters 2-10, pp. 31-173.

Griwodz, Carsten et al., "Protecting VoD the Easier Way," ACM Multimedia '98, 1998, Bristol UK, 21-28.

Griwodz, Carsten, "Video Protection by Partial Content Corruption," Multimedia and Security Workshop at ACM Multimedia, Bristol, UK, Sep. 1998, 5 pages.

Kirovski, Darko et al., "Digital Rights Management for Digital Cinema," Applications of Digital Image Processing XXIV, Andrew G. Tescher, Editor, Proceedings of the SPIE, 2001, 4472:105-120.

"Broadband Streaming: Omneon and BSkyB," Omneon VideoNetworks, www.Omneon.com, TB-1006-1, 4 pages.

Spanos, George Anastasios et al., "Performance Study of a Selective Encryption Scheme for the Security of Networked, Real-Time Video," Proceedings of the 4$^{th}$ International Conference on Computer Communications and Networks (ICCCN '95),1995, 2-10.

Schulzrinne, H. et al., "Real Time Streaming Protocol (RTSP)," Network Working Group, RFC 2326, Apr. 1998, 1-86 (accessed Mar. 30, 2004).

Schulzrinne, H. et al., "RTP: A Transport Protocol for Real-Time Applications," Audio-Video Transport Working Group, RFC 1889, Jan. 1996, 1-75.

European Supplementary Search Report dated Nov. 20, 2006, which issued in the prosecution of European Patent Application No. 04757582.4, 5 pages.

Teixeira, Luis et al., "Secure Transmission of MPEG Video Sources," 5 pages, http://citeseer.ist.psu.edu/cache/papers/cs/11070/http:zSzzSzjaguar.inescn.ptzSzpeoplezSzlm tzSzpublicationszSzartigoszSzispacs_98.pdf/secure-transmission-of-mpeg.pdf.

Wu, Tsung-Li et al., "Selective Encryption and Watermarking of MPEG Video," submitted to International Conference on Image Science, Systems, and Technology, CISST '97, Feb. 1997, 9 pages.

Yoshida, Kazuhiro et al., "A Continuous-Media Communication Method for Minimizing Playback Interruptions," IS&T/SPIE Conference on Visual Communications and Image Processing '99, San Jose, California, Jan. 1999, 3653:748-757.

Zhang, Jian et al., "A Flexible Content Protection System for Media-on-Demand," Proceedings of the IEEE Fourth International Symposium Multimedia Software Engineering (MSE'02), 2002, 6 pages.

* cited by examiner

PREVENTING UNAUTHORIZED MODIFICATION OR SKIPPING OF VIEWING OF ADVERTISEMENTS WITHIN CONTENT

TECHNICAL FIELD

The present invention relates generally to digital conditional access, and more particularly but not exclusively to detecting and preventing a user from modifying or otherwise skipping viewing of advertisements within content.

BACKGROUND

Of all the industries that have been revolutionized by the rise of digital technology and the Internet, few have been swept so greatly as the "content" industries, such as producers and providers of music, movies, pay per view (PPV), Video on Demand (VoD), interactive media, and the like. The Internet has made widespread distribution of such content easier than ever.

As a result, new technologies and user habits are changing the traditional business models for providing content to the user. For example, traditionally, content owners, service operators, service providers, or generally, content providers, seek an additional revenue opportunities based on the distribution of the content over the internet, or other network, or even through a portable storage device. Recently, however, many users have indicated a preference for free content over the network. Thus, content providers and the like, have sought to obtain their revenues through other ways. For example, many content providers seek revenues by providing advertisements with the content. This is making advertisement placements within content as one of the fastest growing sources for additional revenues for the content providers.

However, placement of an advertisement within content does not always result in a user viewing the advertisement. Often the user selects to fast forward or otherwise skip the viewing of the advertisements. Moreover, if the user selects to copy the content, they may sometimes copy only the content, while deleting the advertisements. Such user actions translate in lost revenues for the advertisers and therefore, a decreased willingness to place advertisements in the distributed content. Fewer advertisements translate into less revenue for the content providers. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
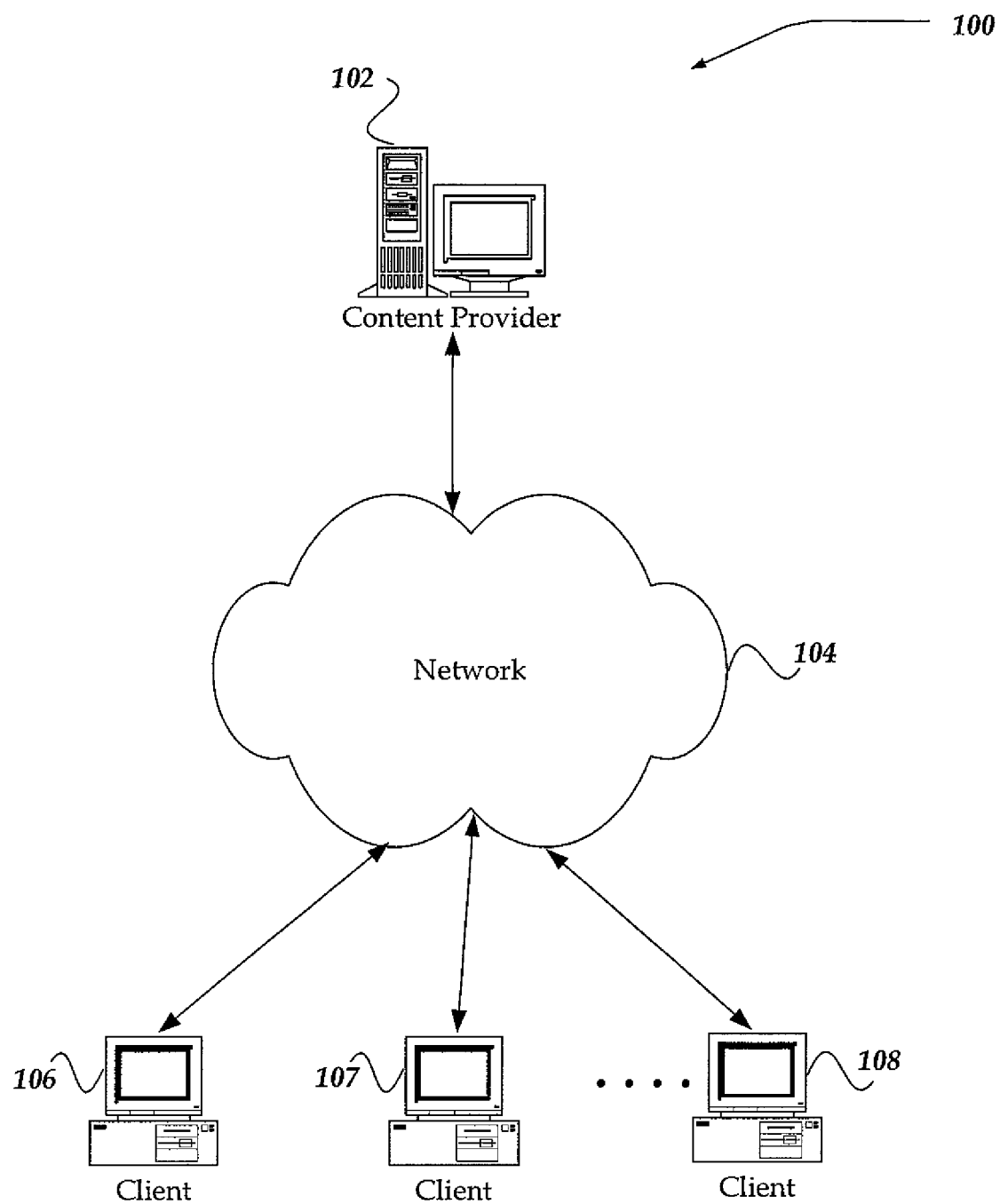
FIG. 1 shows a functional block diagram illustrating an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes, but is not limited to motion pictures, movies, videos, music, PPV, VoD, interactive media, audios, still images, text, graphics, scripts, applications, and other forms of digital content useable by a computing device. However, content is not limited to these examples, and virtually any content may be included, without departing from the scope or spirit of the invention. In one embodiment, the content is provided as a Moving Pictures Experts Group (MPEG) content stream, such as a transport stream, or the like. However, the invention is not so limited, and other file formats may also be employed, without departing from the scope or spirit of the invention. For example, the invention may be configured to employ, without limitation, at least Flash video files (.FLV), Shockwave Flash (.SWF) files, H.263, H.264, Audio Video Interleave (AVI), or virtually any other file format, streaming format, or the like.

Briefly, MPEG is an encoding and compression standard for digital broadcast content. MPEG provides compression support for television quality transmission of video broadcast content. Moreover, MPEG provides for compressed audio, control, and even user broadcast content. One embodiment of MPEG-2 standards is described in ISO/IEC 13818-7 avail- Briefly, various embodiments are directed towards employing a chain of permission keys obtained during playing of advertisements inserted between portions of content to enable continued playing of at least a subsequent portion of the content by a client device. A chain or sequence of encoded permission keys are generated with each encoded permission key, except for a last permission key, incorporating a scrambling key. Each encoded permission key is then used to mark various locations of different advertisements, such that when the advertisement is played, access to at least a portion of the respective encoded permission key may be obtained.

Each scrambling keys is useable to decode a next encoded permission key within the sequence of encoded permission keys that enables playing of the next portion of the content. If playing of any advertisement within the content is avoided or otherwise is skipped, missed, or is not played substantially to completion, access to the associated scrambling key useable to decode a next permission key is prevented. This in turn effectively prevents playing of a next portion of the content.

In another embodiment, a heartbeat analysis may also be performed to monitor if skipping of an advertisement is being attempted, and if so, playing of the content is prevented. In one embodiment, content playing time and playing speed analysis may be used to determine whether an attempt is detected to avoid playing of an advertisement. If so, then playing of the next portion of the content may be inhibited. In one embodiment, a number of skips or avoidance attempts may be allowed before playing of the next portion of the content is inhibited.

In one embodiment, a downloadable component may be provided to the client device by a network device. In one embodiment, the downloadable component may be securely delivered to the client device using any of a variety of mechanisms. The downloadable component may then be used to perform actions, including, for example, decoding the permission keys, checking the validity of the decoded permission keys, and generating and/or providing decryption keys useable to decrypt portions of content. In one embodiment, each decryption key may be generated using a respective decoded permission key. Moreover, analysis of the decoded permission keys may be performed remotely at a network device, or at the client device. For example, in one embodiment, the downloadable component may compare each decoded permission key with an original pattern to validate the permission keys. Various actions may then be performed based on the result of the analysis, including, inhibiting the playing of subsequent content, sending a message to the network device, or the like.

In another embodiment, the network device may be used to detect if attempts are being performed at the client device to avoid playing of the advertisements. For example, the network device may enable the downloadable client component to return results to the network device, where the results may then be analyzed. In one embodiment, the communications between the network device and the client device may be performed using a secure protocol. In one embodiment, to ensure that the client device and network device remain in communications, failure to receive a message from the network device could result in the client device from being inhibited from playing of the subsequent content.

Content may be sent to the client device in a broadcast (e.g., sent to many client devices) or unicast (e.g., sent to an individual client device) mode. Content that is broadcast may be encrypted such that each client device viewing the content may use a same decryption key to decrypt the content. In such instances, it may be appropriate to generate and send one copy of the content to each of the client devices.

Thus, in one embodiment, decryption keys may be securely transmitted to the client device for use in decrypting the content. In another embodiment, the network device may elect to send values that may then be algorithmically compared with the results from playing of the advertisements. These values may then be used to decrypt the content or to deliver permission to content control components that allow the content to continue to play. In one embodiment, each permission key may be combined with another value to generate a decryption key for a subsequent portion of the content.

Where the content is viewed by a single client device, such as in a unicast mode, then, each permission key, or other value may be unique to the client device. In either unicast, or broadcast mode, a component may be downloaded to the client device to enable monitoring and decryption of the content for continued playing.

In one embodiment, a time period is determined that is based on enabling content to have a limited time to play without a permission key. That is a time is assigned for the content to play while portions of the permission key are obtained from the playing of an advertisement, re-assembled and decoded. After the assigned time for such actions to be performed, if no permission is available, then the content may be prevented from playing. In one embodiment, this may be performed by employing the permission key at least in part to decrypt a portion of the content.

It should be noted that a variety of other mechanisms may also be employed during the playing of an advertisement to increase a likelihood that a user views the advertisement. In one embodiment, while an advertisement is being played, selected features of the client device, set top box (STB), or the like, might be modified. For example, in one embodiment, the advertisement might be configured to be 'always on top' of other displayed objects on a display device. This 'always on top' feature might be configured such that the user can not change it during the playing of the advertisement. In another example, a channel change capability might be inhibited during the playing of the advertisement. In this manner, a user might not be able to change the channel of the client display device to view other material while the advertisement is being played. While these are just two examples of possible client device configurations that might be modified while an advertisement is being played, others may also be employed. For example, an audio feature might be modified such that the user can not turn off the audio during playing of the advertisement. Thus, any of a variety of other features can be modified, and the invention is not limited by these examples.

For example, in another embodiment, where it might not be feasible, appropriate, or the like, to automatically enable the advertisement to be "always on top," the movie (or other content) might be stopped from playing when the advertisements are encountered, and then enabled to play again when the advertisement is on top of the screen, again. In the case of STBs, or the like, channel changing might also be inhibited, or, if such feature inhibition is not feasible, then the movie (or other content) might be stopped (e.g., frozen from playing) when the advertisements are encountered. Again, the content may be allowed to play again, once the advertisement has completed.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown in the figure, operating environment 100 includes content provider 102, network 104, and clients 106-108. Network 104 is in communication with and enables communications between content provider 102 and clients 106-108.

One embodiment of a device useable for content provider 102 is described in more detail below in conjunction with FIG. 2. Briefly, however, content provider 102 includes computing devices configured for use by producers, developers, and owners of media content that can be distributed to client devices 106-108. Such content, includes, but is not limited to motion pictures, movies, videos, music, PPV, VoD, interactive media, audios, still images, text, graphics, and other forms of digital content directed towards a user of a client device, such as client devices 106-108. Content provider 102 may also include businesses, systems, and the like that obtain rights from a content owner to copy and distribute the content. Content provider 102 may obtain the rights to copy and distribute from one or more content owners. Content provider 102 may repackage, store, and schedule content for subsequent distribution to other content providers, users of client devices 106-108, and the like.

In one embodiment, content provider 102 may be configured and arranged to receive content and to insert advertisements between portions of the content. Content provider 102 may prepare the advertisements by inserting markers within the advertisements at different locations. The markers may be configured to identify and enable access, during playing of the advertisement, to different portions of a permission key. Content provider 102 may employ one or more encryption keys to selectively encrypt various portions of the content. In one embodiment, the one or more decryption (encryption) keys may be obtained by combining a portion of a key with a permission key.

Content provider 102 may also prepare a heart beat program as described in more detail below for use in monitoring whether a user of a client device is attempting to skip or otherwise avoid playing of an advertisement inserted into the content. Content provider 102 may provide the heart beat program, and/or other downloadable components to a client device for use in playing the content, decoding the permission keys, monitoring heart beats during playing of the content and/or advertisements, and further enabling continued playing of the content as described in more detail below.

Although illustrated as employing network 104 to communicate content to client devices 106-108, the invention is not so limited. For example content provider 102 may employ virtually any mechanism to communicate content, including, but not limited to a data communications line, virtually any storage device, including a CD, a DVD, floppy diskette, magnetic tape, and the like. The content may be selectively encrypted using any of a variety of encryption techniques. Similarly, the content may also be unencrypted.

Devices that may operate as content provider 102 include personal computers desktop computers, multiprocessor systems, microprocessor-based or programmable consumer electronics, network PCs, servers, and the like.

Network 104 is configured to couple one computing device to another computing device to enable them to communicate. Network 104 is enabled to employ any form of computer readable media for communicating information from one electronic device to another. Also, network 104 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 104 includes any communication method by which information may travel between client devices 106-108 and content provider 102.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of client devices 106-108 is described in more detail below in conjunction with FIG. 3. Briefly, however, client devices 106-108 may include virtually any computing device capable of receiving content over a network, such as network 104, from another computing device, such as content provider 102. Client devices 106-108 may also include any computing device capable of receiving the content employing other mechanisms, including, but not limited to CDs, DVDs, tape, electronic memory devices, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, and the like. Client devices 106-108 may also be any device that is capable of connecting using a wired or wireless communication medium such as a PDA, POCKET PC, wearable computer, and any other device that is equipped to communicate over a wired and/or wireless communication medium to receive and play content. Similarly, client devices 106-108 may employ any of a variety of devices to enjoy such content, including, but not limited to, a computer display system, an audio system, a jukebox, set top box (STB), a television, video display device, and the like.

Client devices 106-108 may include a client application that is configured to enable a user to receive content and to play the received content. The client application may also provide other actions, including, but not limited to, enabling other components of the client device to execute, enable an interface with another component, device, the end-user, and the like. Moreover, client devices 106-108 may be configured to receive a downloadable component that may be used to enable monitoring of playing of advertisements inserted within the received content and to enable continued playing of the content based on whether the advertisements are played substantially to completion, or one or more attempts are detected to avoid playing of the advertisements. Such avoidance of playing may be performed through any of a variety of mechanisms, including, but not limited to attempting to fast forward, skip to a section of the content while avoiding playing of the advertisements, copying of the content while not copying of the advertisements for subsequent attempts to play the content, or the like.

Illustrative Server Environment

Figure 2:
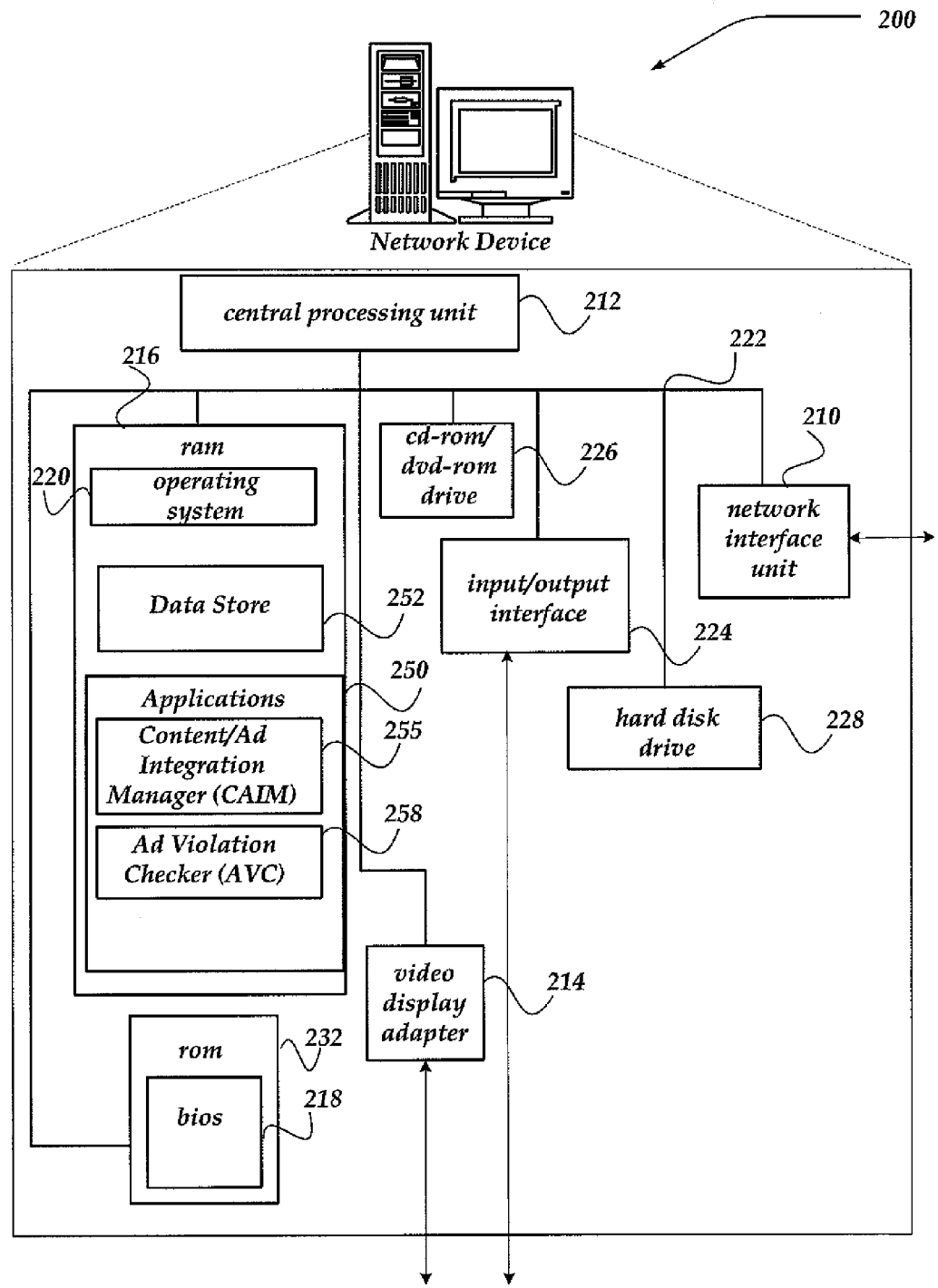
FIG. 2 shows one embodiment of a network device that may be employed within FIG. 1 for preparing and distributing content with advertisements (ads)

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, content provider 102 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, calendars, database programs, word processing programs, HTTP programs, IPSec applications, encryption programs, security programs, VPN programs, SMS message servers, IM message servers, email servers, account management and so forth. The mass memory may, for example, also include data store 252, which is configured and arranged to store virtually any data, including but not limited to authorization data for a subscriber for content; subscriber information; entitlements associated with a subscriber, content, advertisements, downloadable components to be sent to a client device, or the like. Data store 252 is not limited to this information, and other information may also be collected and/or stored within data store 252. In one embodiment, at least some of the data may also be stored in cd-rom/dvd-rom drive 226, and/or hard disk drive 228.

Applications 250 may also include content/advertisement integration manager (CAIM) 255 and Ad Violation Checker (AVC) 258. In one embodiment, CAIM 255 may be configured to receive a request for content from one or more client devices. In another embodiment, CAIM 255 may receive a schedule useable for determining when to provide content to one or more client devices. In any event, CAIM 255 may select advertisements for insertion into the content. In one embodiment, CAIM 255 may employ time markers for use in inserting the advertisement. When a time marker is encountered during playing of the content, an advertisement may be accessed for play. In one embodiment, the time markers identify a beginning time point for each advertisement. In one embodiment, the time markers may also identify an ending time point for each advertisement. In one embodiment, CAIM 255 may create a matrix of time pointers related to the beginning and ending times for each advertisement inserted. The size of the matrix may be $N*2$, where 2 represents the two time points of beginning and end time points, and N represents a number of advertisements inserted throughout the content. In one embodiment, CAIM 255 further inserts digital markers into the advertisements. The insertion locations of the digital markers may be selected based on a variety of criteria, including, but not limited to selecting locations throughout each advertisement at random locations. In one embodiment, the digital markers may be inserted into the advertisements in a manner to ensure that the advertisement is to be played substantially to completion before each of the digital markers is encountered. In one embodiment, a number of inserted digital markers may be selected between three to five per advertisement. However, the invention is not limited to these values, and others may also be selected. In any event, CAIM 255 may then create a matrix representing the digital markers for the advertisements. In one embodiment, the matrix may be of size $N*K$, where K is between 3-5, and represents the digital value for each marker inserted into the advertisement, and N represents a number of the advertisement inserted into the content.

CAIM 255 may further prepare a heart beat program (HBP) that is useable at a client device for monitoring for avoidance of playing of advertisements. In one embodiment, the HBP may include various sub-components, such as a Time Speed Calculation Program (TSCP) that is configured to determine speed acceleration from playing of content time. HBP may also include a Reading Speed Calculation Program (RSCP) that determines speed acceleration from the playing characteristics for content. CAIM 255 may also prepare and provide to a client device a permission key component (PKC) that determines permission keys from the playing of advertisements inserted within content. Each of the prepared client components may be grouped into one or more downloadable components for delivery to a client device. Operations of such downloadable components are described in more detail below in conjunction with FIG. 3.

Upon preparation of the content with the advertisements, and the downloadable client components, CAIM 255 may selectively encrypt the content with the advertisements, and further encrypt the downloadable client components.

In one embodiment, when the content and downloadable components are sent to the client device, some data may be provided to network device 200 for use by Ad Violation Checker (AVC) 258. For example, in one embodiment, AVC 258 may check to see if the results include information about valid permission keys obtained during playing of advertisements by the client device. If the results do not match original permission keys, AVC 258 may take any of a variety of actions to prohibit playing of subsequent content by the client device. In one embodiment, AVC 258 might send a message to the client device to inhibit playing of content. In another embodiment, failure to send information to the client device could result in inhibiting of playing of content by the client device. In one embodiment, AVC 258 may also provide a message to a content owner, service operator, service provider, or the like, indicating that advertisements are being avoided from substantially playing at a client device. In one embodiment, AVC 258 could even direct the client device to corrupt or otherwise destroy the content at the client device, such that it is no longer accessible by the client device.

It should be noted, however, that the invention is not constrained to having AVC 258 perform monitoring of violations of advertisement played by a client device. For example, in another embodiment at least a portion of the downloadable components provided to client device could be configured to monitor for violations, and to further take appropriate actions based on the results of the monitoring. In this manner, the actions of the client device may be monitored and actions taken independent of whether the client device is accessible over a network or not.

Illustrative Computing Device

Figure 3:
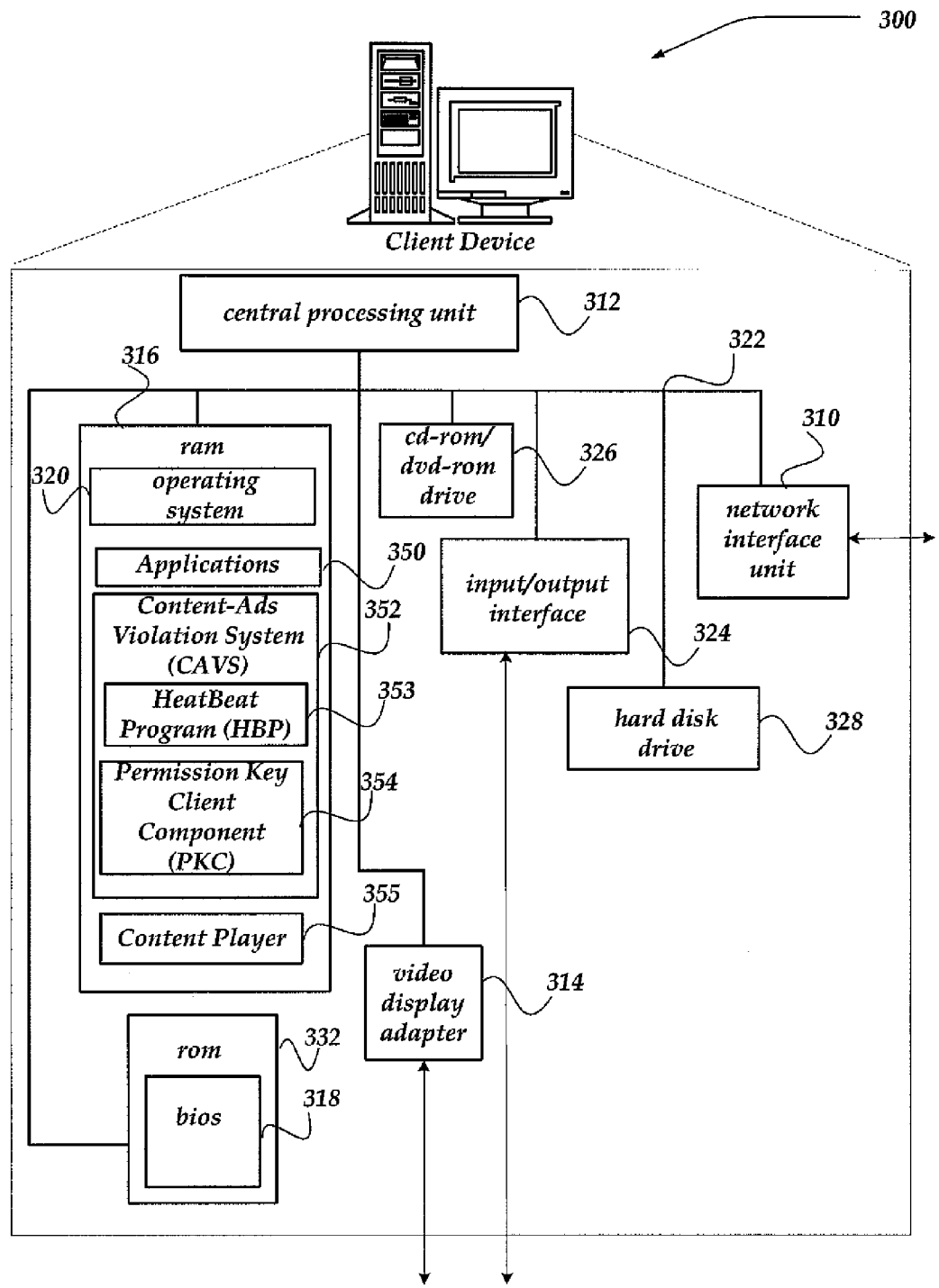
FIG. 3 shows one embodiment of a client device that may be employed within FIG. 1 for use in preventing avoidance of playing of advertisements (ads) within content.

FIG. 3 shows one embodiment of a computing device, according to one embodiment of the invention. Client device 300 may include many more components than those shown. The components shown, however, are sufficient to disclose an illustrative embodiment for practicing the invention. Client device 300 may represent, for example, client devices 106-108 of FIG. 1.

Client device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of client device 300. Any general-purpose operating system may be employed. Basic input/output system ("BIOS") 318 is also provided for controlling the low-level operation of client device 300. As illustrated in FIG. 3, client device 300 also can communicate with the Internet, or some other communications network, such as network 104 in FIG. 1, via network interface unit 310, which is constructed for use with various communication protocols including the TCP/IP protocol. Network interface unit 310 is sometimes known as a transceiver, transceiving device, or network interface card (NIC).

Client device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Client device 300 also includes input/output interface 324 for communicating with external devices, such as a mouse, keyboard, scanner, or other input devices not shown in FIG. 3. Likewise, client device 300 may farther include additional mass storage facilities such as CD-ROM/DVD-ROM drive 326 and hard disk drive 328. Hard disk drive 328 may be utilized to store, among other things, application programs, databases, client device configuration information, policy, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include, but is not limited to transcoders, schedulers, calendars, database programs, word processing programs, HTTP programs, audio players, video players, VoD players, decoders, decrypters, PPV players, interface programs to STB, interface programs to a television, video camera, and so forth. One such player is illustrated by content player 355, which may be configured to operate in conjunction with content-Ads Violation System (CAVS) 352. CAVS 352 may be a downloadable component that is provided over a network, through a portable computer-readable storage medium, or the like. As illustrated, CAVS 352 may include HBP 353, and/or permission key client component (PKC) 354.

In one embodiment, CAVS 352 may be provided in encrypted form to minimize likelihood that a hacker might attempt to gain access to it, or the like. When content is played by content player 355, CAVS 352 may gather statistical information and monitor for advertisement rules violations. In one embodiment, when various markers are encountered during playing of advertisements, CAVS 352 might create permission keys and determine whether subsequent content may be played. In one embodiment, HBP 353 may further monitor for attempts to fast forward or otherwise avoid playing of advertisement, and to also prevent playing of content, if such advertisement avoidance is detected.

Generalized Operation

Figure 4:
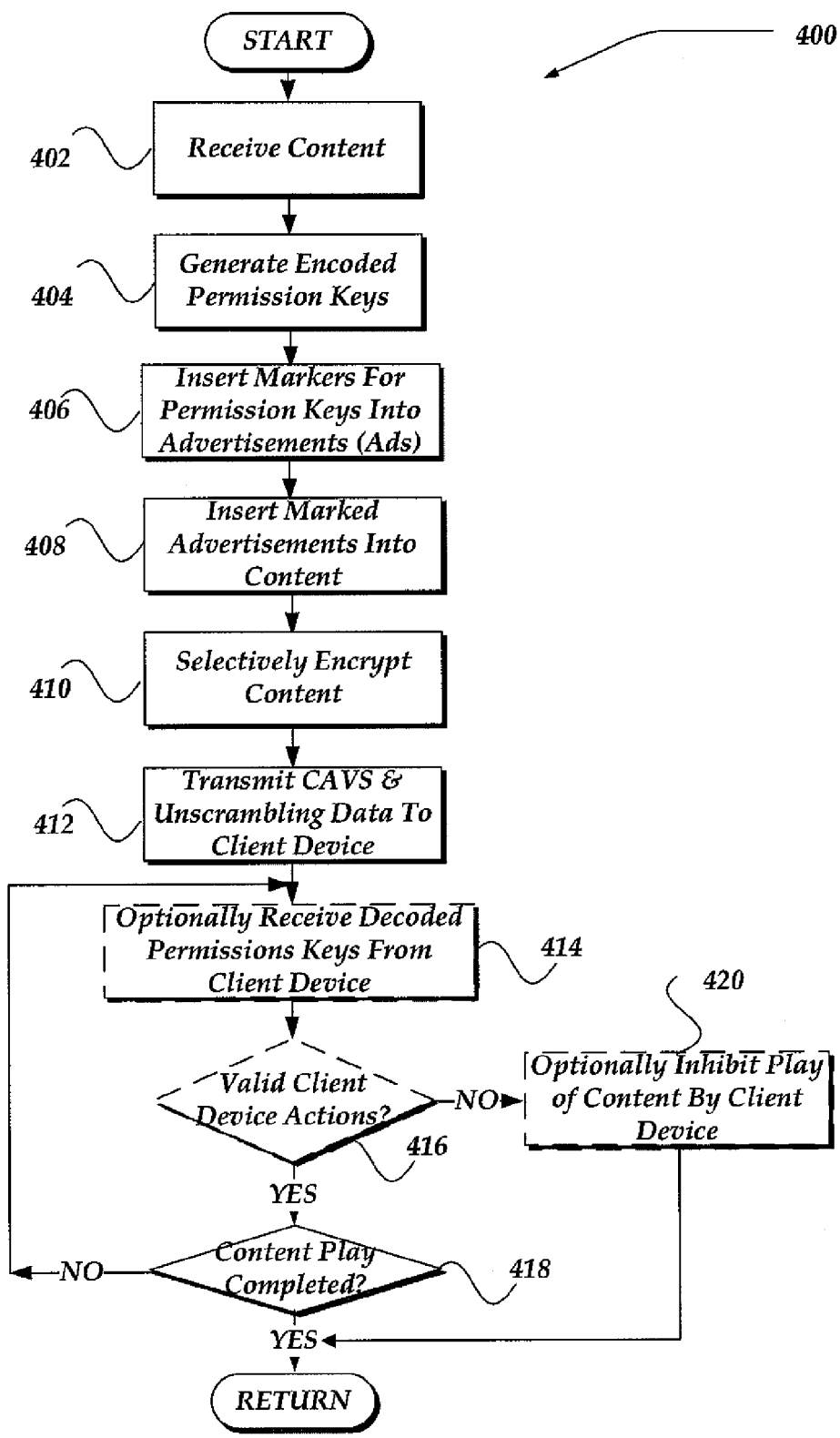
FIG. 4 illustrates a logical flow diagram generally showing one embodiment of an overview of a process for a network device to manage avoidance of playing of advertisements by a client device.

The operation of certain aspects of the invention will now be described with respect to FIGS. 4-7. FIG. 4 illustrates a logical flow diagram generally showing one embodiment of an overview of a process for a network device to manage avoidance of playing of advertisements by a client device.

Process 400 of FIG. 4 may be implemented within network device 200 of FIG. 2, in one embodiment. Process 400 may begin, after a start block, at block 402, where content is received. Such content may represent any of a variety of content and/or any of a variety of content formats.

Processing next flows to block 404 where permission keys are generated. Generation of such permission keys and subsequent decoding by a client device is described in more detail below. Briefly, however, a permission key may be a number that may be selected using any of a variety of mechanisms. In one embodiment, a permission key is a number comprising about ten characters or digits (although another number of characters may also be selected) that may be chosen at random. In one embodiment, the digits may be divided or partitioned into several portions. In one embodiment, the permission key may be partitioned into between 3 to 5 portions. The portions may then be scrambled along with other modifications, such as those described below, to generate an encoded permission key.

Moving to block 406, the encoded portions may then be inserted into an advertisement using a marker at a same sequence as they are in once encoded In one embodiment, the encoded portions are inserted at randomly selected locations throughout the advertisement.

Processing then flows to block 408, where the advertisements with the markers may then be associated with the content through markers that are inserted at various locations throughout the content. In one embodiment, the markers effectively partition the content into various portions, each portion being separated by one or more advertisements.

Process 400 flows next to block 410, where the content with the advertisements may then be selectively encrypted. In one embodiment, the encryption is performed using encryptions key that are generated by the permission keys. For example, a permission key may be combined with another value to generate an encryption/decryption key, which is then used to encrypt a portion of content that is subsequent in sequence to an advertisement that includes the permission key. Thus, when an advertisement is played at a client device, the partitioned permission key may be obtained and used to decrypt a subsequent portion of content.

Processing continues then to block 412, where the encrypted content, an initial scrambling key, downloadable components, such as the CAVS described above, as well as possibly other information, is sent to a client device.

Processing may then perform various optional blocks, to monitor for advertisement violations, or in another embodiment, process 400 may return to a calling process to perform other actions. If the optional blocks are to be performed, processing may flow from block 412 to block 414, where information may be received from a client device. In one embodiment, the information may include a decoded permission key. In another embodiment, the information may include heartbeat information indicating whether a user is improperly attempting to skip or otherwise avoid playing of advertisements.

Optional processing may then flow to decision block 416, where a determination is made whether the received information indicates that the client device is not attempting to avoid playing of advertisements. If attempts to avoid playing of advertisements are detected, processing may flow to optional block 420; otherwise, processing may flow to decision block 418.

At block 420, any of a variety of actions may be performed to inhibit playing of the content by the client device, including, but not limited to sending instructions to the client device to inhibit playing, erase the content, or the like. In one embodiment, a message may also be sent to a content owner, provider, or the like, indicating that client device is detected to have attempted to avoid playing of advertisements.

At decision block 418, if more content is to be played by the client device, processing loops back to optional block 414; otherwise, processing may return to a calling process to perform other actions.

Figure 5:
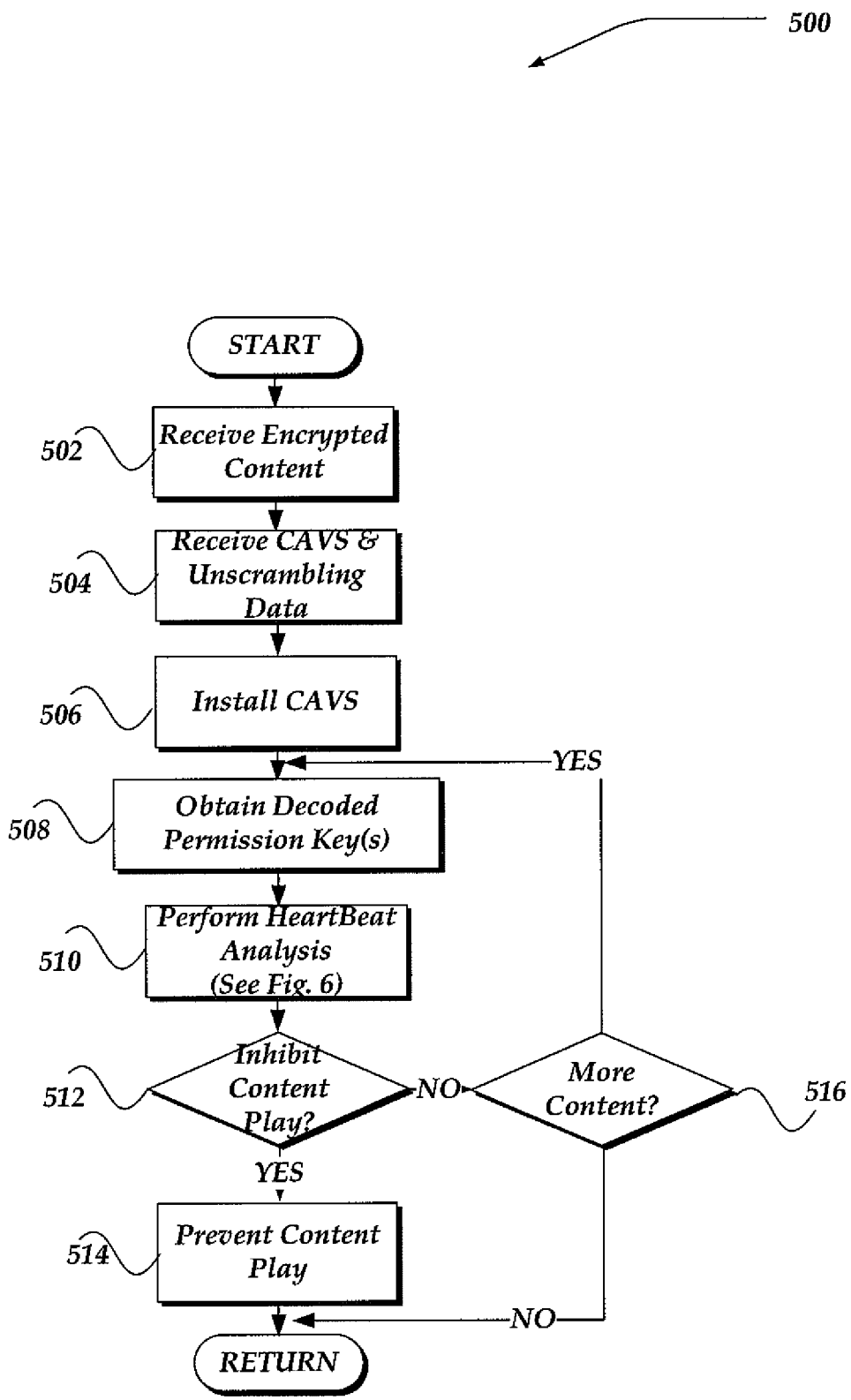
FIG. 5 illustrates a logical flow diagram generally showing one embodiment of an overview of a process for a client device to manage avoidance of playing advertisements.

FIG. 5 illustrates a logical flow diagram generally showing one embodiment of an overview of a process for a client device to manage avoidance of playing advertisements. Process 500 of FIG. 5 may be implemented within a client device, such as client devices 106-108 of FIG. 1.

Process 500 begins after a start block, at block 502, where encrypted content is received. Such content may be received with advertisements inserted throughout. Processing continues to block 504, where a downloadable component (CAVS) may also be received. It should be clear that the downloadable component may be received concurrent with or even before receiving of the content. In any event, processing flows next to block 506, where the downloadable component may be installed onto the client device.

Processing flows next to block 508, where as the inserted advertisements are played, the portions of the inserted encoded permission keys are encountered, combined, and decoded to generate the decoded permission keys.

Processing continues to block 510, where the downloaded heartbeat program (e.g., within downloadable component CAVS), is executed to monitor for an analysis playing of the content and/or advertisements to detect an attempt to avoid playing of advertisements. In one embodiment, blocks 508 and 510 may be performed concurrently, or even in reverse order.

Moving next to decision block 512, a determination is made based on the results of blocks 508 and/or 510, whether to inhibit playing of a subsequent portion of the content. That is if it is determined that avoidance of playing substantially all of an advertisement is detected, processing may flow to block 514; otherwise, processing flows to decision block 516. At decision block 516, determination is made whether more content is to be played. If so, processing may loop to block 508; otherwise, processing may return to a calling process to perform other actions.

At block 514, various actions may be performed to inhibit playing of subsequent portions of the content, including, but not limited to inhibiting decryption of the content, erasing of the content, or the like. In one embodiment, absence of a valid permission key may result in an inability to decrypt and/or play the subsequent portion of the content. That is, each permission key, except a last permission key, may include a scrambling key obtained during playing of a previous advertisement. The scrambling key is then used to unscramble a subsequent encoded permission key similarly obtained during playing of a subsequent advertisement. If a previous advertisement is skipped or removed, or otherwise is not played, then a subsequent valid permission key is unlikely to be successfully obtained, resulting in inhibiting of playing of subsequent content. In any event, upon inhibiting of playing of the subsequent content, processing may then return to a calling process to perform other actions. It should be noted, that in one embodiment, a user of the client device could 'rewind' the content and then play the advertisements that were avoided. In this manner, the user may then be enabled, in one embodiment, to play the subsequent content.

Heartbeat Analysis

Figure 6:
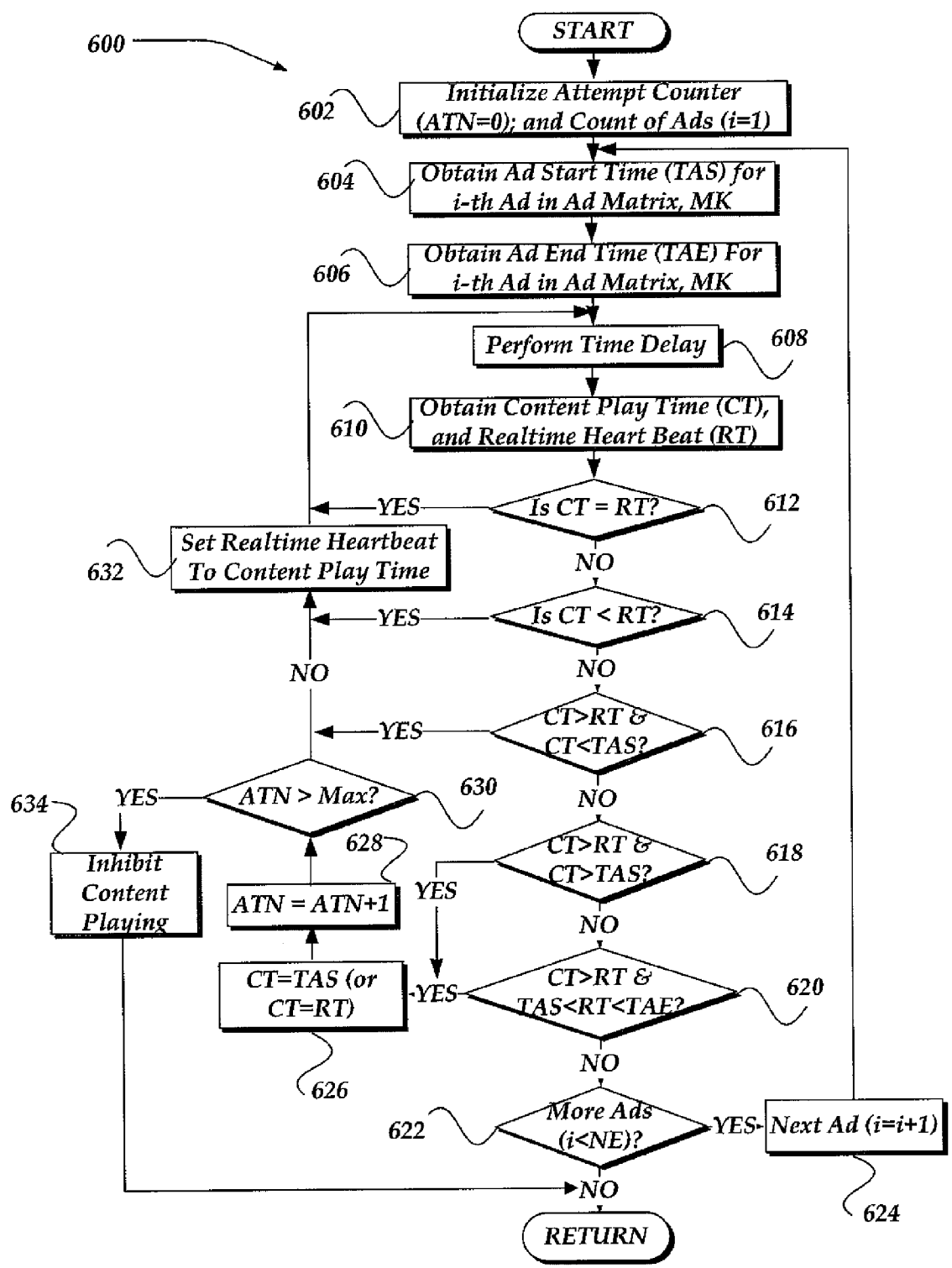
FIG. 6 illustrates a logical flow diagram generally showing one embodiment of a heartbeat process for use in managing avoidance of playing of advertisements by a client device.

FIG. 6 illustrates a logical flow diagram generally showing one embodiment of a heartbeat process for use in managing avoidance of playing of advertisements by a client device.

Process 600 may be implemented within a downloadable component, such as the HBP described briefly above in conjunction with FIG. 3. Process 600 may be configured to determine a realtime heartbeat value (RT) that represents an actual time. In one embodiment, RT may be determined based on a secure computation, an entered time, or the like. Process 600 may further determine a content time (CT) based on time of playing content/advertisement up to a current position within the content/advertisement. In one embodiment CT may be obtained from a content player's properties, such as a current position that sets or retrieves a value representing a content's current position. In one embodiment, the times may be seconds, fractions of sections, minutes, or the like. In one embodiment, for example, a content player, such as Windows Media Player, or the like, may provide an output such as a current state that specifies or may be used to determine a playback file's current state, including, but not limited to whether the content is stopped, paused, running, a duration of play, or the like. Such information may be used to determine a value indicating the content's playing time. Moreover, other information may also be obtained, including a file name that sets or retrieves a value indicating the content being played, or to be played, a source protocol indicating a type of format or protocol of the content, or the like. In one embodiment, such information may be obtained from the content player and provided to process 600.

Process 600 may then determine and employ values for RT and CT for use in determining whether a user of a content player is attempting or has attempted to skip or otherwise avoid playing of inserted advertisements. Thus, in one embodiment, briefly, process 600 may determine values for RT and CT. The process may determine, for example, whether CT-RT is about zero, indicating that advertisements are not being avoided. If CT-RT is less than about zero, then it may indicate that a rewind event is detected. However, if CT-RT is greater than about zero, then a condition of forwarding the content is detected that may indicate an attempt to avoid playing of an advertisement. As used herein, the term "about" some numeric value (e.g., about zero) is used in recognition that many digital computations may result in truncations, round-off errors, or other forms of numerical errors. As such, obtaining an exact value comparison in some situations might not occur. Thus, the term "about" is used to recognize those situations by employing an epsilon value (e.g., about) to account for the numerical imprecisions that might arise. Epsilon then may be determined based on characteristics, in one embodiment, of the computing device(s) employed, or the like, and may vary from device to device.

Analyzing such a situation may be performed by employing a two dimensional array of time pointers related to a beginning of each advertisement and an ending time of each advertisement inserted within the content. Such array may be of size NA*2, where NA is a number of advertisements. Then, assume that X1 is a vector that represents the time when advertisements start, and X2 represents the time when advertisements end, each vector having a same size K, where K=1, NA. Further, the vectors may be represented by a matrix, MK=|Xij|, where i=1, NA, and j=1, 2, where i represents the number of advertisements, and j represents the start and end times for each advertisement.

Process 600 may then be used to monitor for conditions where a user is attempting to avoid playing of the advertisements. Process 600 may begin, after a start block, at block 602, where an attempt counter (ATN) may be initialized. ATN is used to provide a user with a defined number of attempts to correct avoidance of playing advertisements up to a maximum number of attempts (Max), before inhibiting playing of subsequent portions of the content. At block 602, a counter, i, for the i-th advertisement may also be initialized.

Processing continues to block 604, where a start time (TAS) for the ith advertisement is obtained. In one embodiment, the start time TAS may be obtained from the MK matrix described above. Processing flows next to block 606, where the end time (TAE) is obtained from the MK matrix for the i-th advertisement.

Processing flows next to block 608, where some pre-defined delay may be injected to enable some amount of time to elapse in playing of content, an advertisement, or other action by the user to occur.

Processing continues after the pre-defined delay time, to block 610, where CT and RT are obtained, as described above. Continuing next to decision block 612, a determination is made whether CT is about equal to RT. If so, processing loops back to block 608; otherwise, processing flows to decision block 614.

At decision block 614, a determination is made whether CT is less than about RT. If so, then processing proceeds to block 632, where RT is set equal to CT. Processing loops back to block 608 after that. However, if not true, then processing flows to decision block 616, where determinations are made whether CT is greater than about RT, and whether CT is less than about TAS. If this is the case, then processing loops back to block 632, and then back to block 608. Otherwise, processing continues to decision block 618.

At decision block 618, determinations are made whether CT is greater than about RT, and whether CT is greater than about TAS. In one embodiment, the determination may further include testing to also determine whether RT is less than or equal to about TAS. If such conditions are detected, indicating an attempt to avoid playing of an advertisement is detected, processing flows to block 626; otherwise, processing continues to decision block 620.

At block 626, one of several optional actions may be taken. For instance, in one embodiment, CT may be set to TAS, In another embodiment, CT may be set to RT. Processing then flows to block 628, where the ATN counter is incremented. Processing then flows to decision block 630 to determine whether the number of attempts (ATN) has exceeded the Max allowed attempts. If so, processing flows to block 634; otherwise, processing loops back to block 632 as described above.

At block 634, several actions may be taken to inhibit playing of subsequent content by the content player, including, but not limited to erasing the content, inhibiting decryption of subsequent portions of the content, or the like. In one embodiment a message may be sent over a network to a network device indicating that advertisement avoidance attempts have been detected at the content player. Processing then returns to a calling process to perform other actions.

If, at decision block 618, processing flowed to decision block 620, determinations are made to determine whether CT is greater than about RT, and whether RT is greater than about TAS but less than about TAE. If so, then an attempt to avoid playing of an advertisement is detected and processing flows to 626 to perform actions as described above. Otherwise, processing flows to decision block 622, where a determination is made whether there are more advertisements to monitor. If so, processing loops to block 624, where the counter, i, is set to the next advertisement; and processing loops back to block 604 to continue monitoring for advertisement violations. If no more advertisements are to be monitored, then processing returns to a calling process to perform other actions.

It should be noted that the above process may also be modified to perform comparisons based on various other mechanisms, including, for example, differences in times between measures. For example, in one embodiment, various content times, CT2 and CT1, and real-times RT2 and RT1 may be determined after N seconds, and then delta values between CT2 and CT1, and RT2 and RT1 may be employed. Use of delta values may then enable process 600 to monitor whether, for example, content delta and real delta differences result is negative, indicating that content is being rewound, or if the result is equal to about one, then content is being playing normally, or if the result is greater than about one, then attempt to fast forward the content is detected. However, other mechanisms for performing time comparisons to determine an attempt to avoid advertisements may also be readily employed. Thus, the invention is not limited to merely the above embodiments, and others are also envisaged.

While the above approach employs speed differences, the invention is not constrained to merely these approaches. For example, in another embodiment, for every time period, a speed difference in a reading characteristic for the client device may be determined from a player process behavior, or the like. Differences in speed reading differences may then be used to allow continued playing or to inhibit the playing of the content.

In another embodiment, for every time period, a determination may be made from an audio stream to determine a speed in time and a difference in time flow between the real time heart beats and the audio time. This difference may also be used to inhibit playing of a portion of the content. Still other approaches may determine a difference in time flows between the real time heart beats and audio times and use the differences for inhibiting or enabling playing of a portion of the content. Thus, the invention should not be constrained to merely the above heartbeat embodiment, and other approaches may also be used, alone or in combination, without departing from the scope of the invention.

Permission Keys

Processes 400 and 500, above briefly described generating and using permission keys for use in preventing avoidance of playing of advertisements inserted within content. The following provides more details for one embodiment of generating and using such permission keys. However, it should be noted that other mechanisms may also be employed that use permission keys that include a component that enables obtaining of a subsequent permission key, where each permission key enables playing of a subsequent portion of content.

As described above, in one embodiment, the generation of the permission keys and advertisements may be performed at a network device, such as content provider 102 of FIG. 1.

For purpose of illustrations, assume that each permission key comprises 10 digits. It should be clear, however, that other lengths (number of digits) may be selected. Thus, the invention is not limited to 10 digits. In any event, assume that the 10 digits (or other number of digits) are partitioned into groups of digits. In one embodiment, the partitioning may be into any number of digits, such as between 3-5 digits per group. However, for ease of illustration, assume that the 10 digits are partitioned into 5 pairs of digits. Each pair of digits may include any two digit values, such as 00 to 99, 10 to 99, or the like.

Next, a random number generator, pseudo random number generator, or the like, may be employed to generate the 10 digits for a permission key. For illustration purposes, assume that the generator generated the following output, paired into 5 sets: 21, 14, 35, 55, and 77, representing a first permission key: 2114345577.

Next, another random number generator, pseudo random number generator, or the like, may be used to generate a scrambling key having values between 1 and 5, where 5 represents the number of groups selected. Moreover, the generator is arranged such that each number in the scrambling key is produced only once.

Let's assume that the output from the generator is as follows for the first scrambling key: 3, 5, 2, 4, and 1. The scrambling key then represents a new consequence for pairs of digits in scrambling the permission key for a first advertisement to be inserted into content. To obtain a scrambled permission key, the following process may be used: the scrambling key may be used to relocate portions of the permission key into different locations. For example, the first digit of the first scrambling key, 3, may indicate that the first pair of digits, 21, in the first permission key is relocated to a third position within the permission key. That is:

3, 5, 2, 4, 1—first scrambling key 21, 14, 35, 55, 77—first permission key yields the following scrambled first permission key:

77, 35, 21, 55, 14—first scrambled permission key.

A second random number may be generated to produce a second scrambling key. For illustration purposes, assume that the second scrambling key is: 4, 3, 5, 1, and 2, which is useable to unscramble a second permission key.

Next, any of a variety of reversible actions may be performed to combine the second scrambling key with the first (scrambled) permission key. One possible combination is as follows: first, each pair of digits within the first scrambled permission key may be multiplied by 10. Other values may also be chosen. Performing such multiplication results in:

770, 350, 210, 550, 140—first modified scrambled permission key.

Next, the second scrambling key may be added to the first modified scrambling permission key, pairwise. A result of such addition might generate the following:

774, 353, 215, 551 142 representing a first encoded permission key. The above actions may be performed M times to generate M permission keys, where M is a number of advertisements to be inserted into the content. Additionally, the process may also be used to generate M scrambling keys. For illustration purposes, assume the following result for scrambling keys:

3, 5, 2, 4, 1 4, 3, 5, 1, 2 2, 5, 3, 1, 4 3, 4, 5, 2, 1

Let the above matrix be denoted as M1. Similarly, the following illustrates one possible matrix of permission keys, M2:

21, 14, 35, 55, 77 41, 33, 75, 15, 52 12, 45, 63, 71, 44 23, 74, 45, 22, 81

Performing the actions described above using M1 to scramble and combine subsequent rows of scrambling keys yields the following encoded scrambled permission key matrix, M4:

774, 353, 215, 51, 142 152, 525, 333, 411, 754 713, 124, 635, 442, 451 81, 22, 23, 74, 45

As may be seen above, the last row might be left scrambled, but not combined with a subsequent scrambling key, as there would be no subsequent scrambling key for this example. However, a variety of other actions may be performed on the last row, including, but not limited to multiplying the digits by 10, for example. In one embodiment, the above actions may be performed at block 404 of process 400 described above.

The next step is to insert markers into advertisements, as briefly described above at block 406 of process 400. To perform such actions, one embodiment may include insertion of a number of markers into each advertisement between times when the advertisement starts, and when the advertisement ends. For each advertisement, the number of inserted markers is equal to the number of columns of matrix M4. The markers may be inserted using any of a variety of mechanisms to select locations, including, but not limited to selecting the locations at random. In one embodiment, however, it may be desirable to place at least one marker substantially near an end of the advertisements to encourage playing of the advertisement substantially to completion. Typically, one marker is located at each selected location. In one embodiment, each marker may be identified by a unique name and current number, as well as a time (position). Such parameters may be obtained using a variety of mechanisms. For example, using Windows Media Player, markers may be specified using such commands as currentMarker that specifies a marker number, get- MarkerCount to specify a total number of markers in the advertisement, getMarkerName to specify a name of an indexed marker, or getMarkerTime to obtain a time of insertion of the indexed marker. Such commands and parameters may be exposed through a content player's command interface. However, other mechanisms for inserting, and/or otherwise managing markers may also be used, without departing from the scope of the invention.

In one embodiment, such inserted markers may be configured to call events, or the like, that are enabled to run functions for determination of various data useable for determining whether an advertisement rule is being violated, such as avoiding of playing an advertisement. In any event, the values for each row of M4 may be inserted throughout advertisements, such that the first row is inserted in a first advertisement, the second row in a second advertisement, and so forth. The advertisements may then be inserted throughout the content in the maintaining the defined order of advertisements.

In one embodiment, the first row (first scrambling key) of matrix M1 may be sent to the client device for use in decoding the first permission key. In one embodiment, the first scrambling key may be encrypted and set with the downloadable component, the selectively encrypted content, or through some other mechanism. In one embodiment, the client device may also receive, at least M2 for use in validating decoded permission keys obtained during the play of advertisements. In another embodiment, M2 might not be sent, but instead another matrix may be sent, where each row might be combined with the corresponding decoded permission key to generate a decryption key useable to decrypt a subsequent portion of content. If the permission key obtained from the advertisement is invalid, then the resulting decryption key would also be invalid and unable to decrypt the content. In still another embodiment, validating the resulting permission key against M2 may enable access to a decryption key that enables decryption of the content for continued playing. However, other mechanisms of employing the resulting permission keys to determine whether to play subsequent portions of content may be used, without departing from the scope of the invention.

Client Side Use of Permission Keys

As described above, process 500 disclosed receiving the content, receiving and installing the downloadable component, and playing the content/advertisements to obtain the permission keys. The following provides one example illustration of obtaining the permission keys.

When an advertisement is played, the inserted markers are encountered, and portions of an encoded permission key may be obtained. Continuing the example above, playing of the first advertisement would then enable the client device to obtain the following first encoded permission key:

774, 353, 215, 551, 142

In one embodiment, the advertisement might be played substantially to completion to obtain all of the portions of the encoded permission key. Then, the first scrambling key may be used to decode the permission key. Also obtained during these actions will be the second scrambling key, useable to decode the second encoded permission key obtained during the playing of the second advertisement. In any event, one approach to obtain the second scrambling key and decode the first permission key may include: performing a module 10 on the encoded first permission key to generate array_2; and further dividing by 10 the encoded first permission key and placing the resulting integer value into array_1. For the example, array_1 might result in: 77, 35, 21, 55, 14, and array_2 might be: 4, 3, 5, 1, 2. Array_2 would then be the second scrambling key for use in the second permission key.

The first scrambling key may then be used to unscramble array_1 to generate the resulting decoded first permission key, by relocating pairs of digits into appropriate locations: 21, 14, 35, and 77.

The resulting value may then be compared, in one embodiment, to the original permission key, obtained from the first row of matrix M2. If they match, then content after the first advertisement and before the next marked advertisement may be enabled for play. If, however, the permission keys do not match, then the content might be inhibited from playing. As can be seen, each scrambling key, except the first scrambling key, is obtained from a previous permission key which is obtained during the playing of the previous advertisement, in a chained sequence of actions. Thus, if any previous advertisement is skipped or otherwise fails to be played, then the permission key, and the next scrambling key is not obtained. This means that the next content can not be played, and subsequent permission keys are not successfully decoded for playing of subsequent content. This chain or sequence of actions is illustrated further in FIG. 7.

Figure 7:
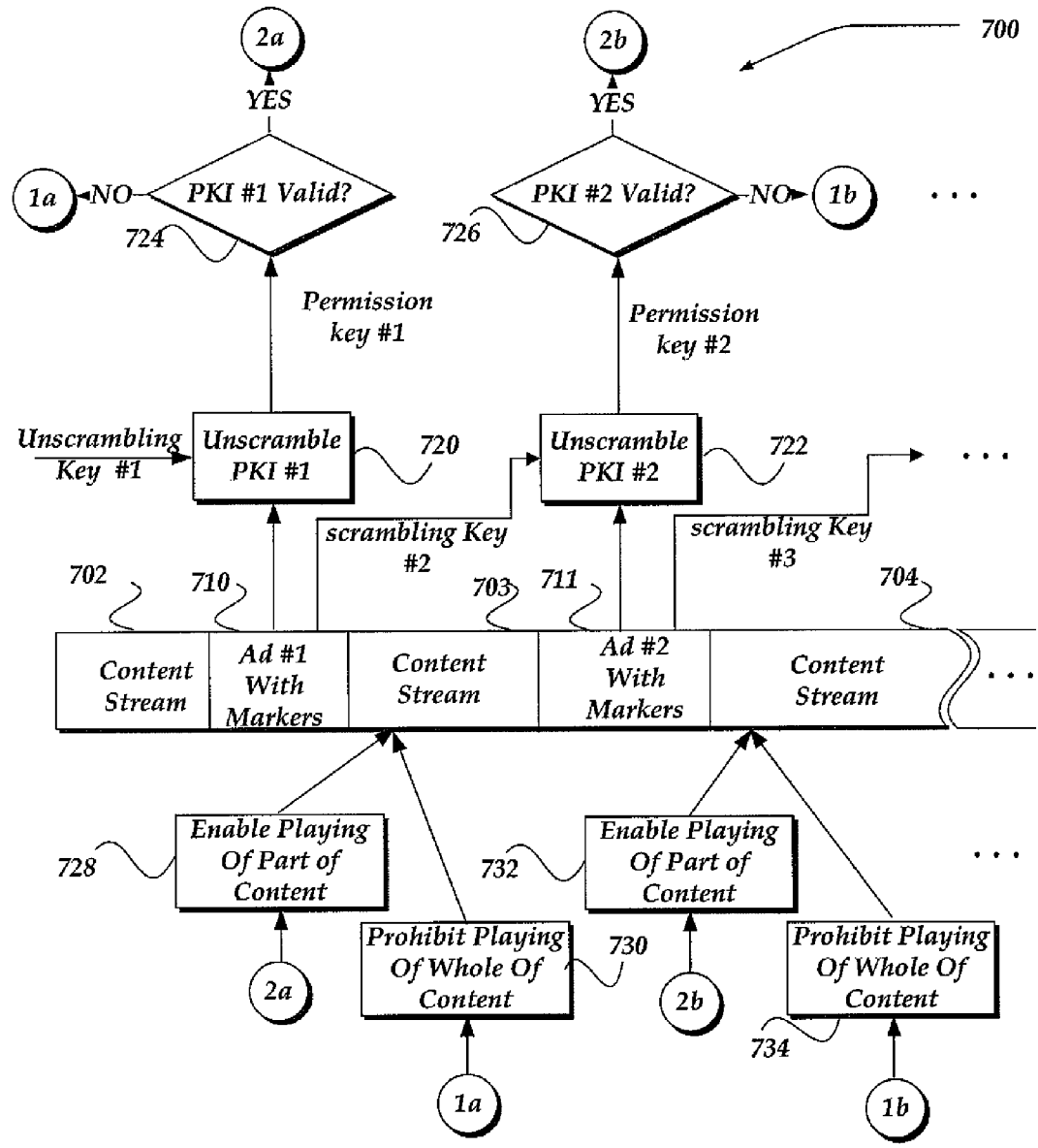
FIG. 7 illustrates a functional diagram generally showing an overview of a process useable in managing avoidance of playing of advertisements using permission keys.

FIG. 7 illustrates a functional diagram generally showing an overview of a process useable in managing avoidance of playing of advertisements using permission keys.

As shown in diagram 700, content is partitioned into several portions represented by portions 702-704, where each portion is separated by a marked advertisement, 710-711. As an advertisement is played, block 720 may obtain a respective encoded and scrambled permission key. As described above, a scrambling key may be obtained either from a previous advertisement, or provided from a network device. The above described actions may be performed at block 720 to generate a next scrambling key (#2), and a first permission key (#1). The first permission key #1 may then be evaluated, in one embodiment, at decision block 724, to determine whether it is valid. If it is valid, then processing may flow to block 728 to enable playing of the content following the advertisement (content 703, following advertisement 710). If the permission key #1 is determined to be invalid, then processing may flow to block 730, where the subsequent content (content 703) may be inhibited from playing.

Similarly, as shown, scrambling key #2 may be provided together with a second encoded and scrambled permission key obtained during playing of a second advertisement (advertisement 711). At block 722, the permission key #2 is obtained and provided to decision block 726 to determine if it is valid. If so, then content following advertisement #2 (content 704) is allowed to play (through block 732); otherwise, if the permission key #2 is invalid, then content 704 may be inhibited from playing (through block 734). Scrambling key #3 may also be obtained and used for obtaining a subsequent permission key, as described above.

As noted above, any of a variety of features of the display client device may also be modified to increase a likelihood that the advertisement will be watched, including, but not limited to inhibiting a audio volume change feature, inhibiting a channel change feature, modifying the advertisement display feature such that it is 'always on top' of other displayed objected, or the like.

In those situations where it might not be feasible, or the like, to automatically enable the advertisement to be "always on top," the content might be stopped from playing when the advertisements are encountered, and then enabled to play again when the advertisement is on top of the screen, again. In the case of STBs, or the like, channel changing might also be inhibited, or, if such feature inhibition is not feasible, then the content might be stopped (e.g., frozen from playing) when the advertisements are encountered. Again, the content may be allowed to play again, once the advertisement has completed.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions, and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system configured to manage viewing of advertisements within content, comprising:
processor; and
a non-transitory memory storing instructions that when executed by the processor cause the processor to perform steps comprising:
employing a different scrambling key that scrambles each of at least two permission keys;
generating at least two encoded permission keys by combining each scrambled permission key with a next scrambling key;
marking different portions of at least two advertisements based on different ones of the at least two encoded permission keys;
partitioning the content into portions of content separated by at least one of the marked advertisements;
providing the partitioned content to a client device with the marked advertisements; and
providing a downloadable client component to the client device, the client component containing instructions that when executed by a processor on the client device cause the processor on the client device to perform steps comprising:
receiving the partitioned content with the marked advertisements;
obtaining a first encoded permission key during playing of a first marked advertisement;
extracting the next scrambling key from the first encoded permission key;
obtaining, during the playing of a second marked advertisement, a second encoded permission key;
unscrambling a permission key associated with the second encoded permission key using the next scrambling key; and
playing a subsequent portion of the content using the unscrambled permission key.

2. The system of claim 1, wherein the downloadable client component further comprises instructions that when executed cause the processor on the client device to perform steps comprising:
performing a heartbeat analysis while the content or advertisements is playing, the heartbeat analysis comprising:
determining a start time and end time for each advertisement;
determining a content play time (CT) and a real-time (RT);
determining whether the CT is greater than about the RT, and the CT is greater than about the start time of an advertisement;
based on the determination that the CT is greater than about the RT, and the CT is greater than about the start time of the advertisement, detecting an attempt to avoid playing of the advertisement and inhibiting playing of the content;
determining whether the CT is greater than about the RT, and the RT is between about the start time and end time for the advertisement; and
based on the determination that the CT is greater than about the RT, and the RT is between about the start time and end time for the advertisement, detecting an attempt to avoid playing of the advertisement and inhibiting playing of the content.

3. The system of claim 1, wherein the instructions for marking different portions comprise instructions stored in the non-transitory memory that when executed by the processor cause the processor to perform steps comprising:
partitioning each permission key into a plurality of partitions;
associating each partition within the plurality of partitions for a given encoded permission key to a marker; and
inserting the markers for the given encoded permission key at randomly selected locations throughout an advertisement.

4. The system of claim 1, wherein the instructions for scrambling a permission key comprise instructions stored in the non-transitory memory that when executed by the processor cause the processor to perform steps comprising:
partitioning a respective permission key into a plurality of digits; and
employing the scrambling key to re-locate the plurality of digits within the permission key;
wherein combining the scrambled permission key with the next scrambling key further comprises combining the scrambled plurality of digits with the next scrambling key using a reversible process allowing the next scrambling key to be obtained from the encoded permission key.

5. The system of claim 1, the non-transitory memory further storing instructions that when executed by the processor cause the processor to perform steps comprising:
selecting each scrambling key such that each bit within a given scrambling key identifies a location within a given permission key in which to re-locate bits from a first location to the location, the first location being identified by a location of each bit within the given scrambling key.

6. The system of claim 1, wherein the instructions for playing a subsequent portion of the content using the unscrambled permission key comprise instructions in the client component that when executed by a processor on the client device cause the processor on the client device to perform steps comprising:
   determining whether the unscrambled permission key and an original copy of the respective permission key are equal;
   based on a determination that the unscrambled permission key and the original copy of the respective permission key are equal, enabling the subsequent portion of the content to play; and
   based on a determination that the unscrambled permission key and the original copy of the respective permission key are not equal, inhibiting playing of the subsequent portion of the content.

7. A method for managing viewing of advertisements within content by a client device, comprising:
   employing, by a processor, a different scrambling key that scrambles each of at least two permission keys;
   generating, by the processor, at least two encoded permission keys by combining each scrambled permission key with a next scrambling key;
   marking, by the processor, different portions of at least two advertisements based on different ones of the at least two encoded permission keys;
   partitioning, by the processor, the content into portions of content is separated by at least one of the marked advertisements; and
   providing, by the processor, a downloadable client component to the client device, the client component containing instructions that when executed by a processor on the client device cause the processor on the client device to perform steps comprising:
      receiving, by the client device, the partitioned content with the marked advertisements;
      obtaining, by the client device, a first encoded permission key during playing of a first marked advertisement;
      extracting, by the client device, the next scrambling key from the first encoded permission key;
      obtaining, by the client device, during the playing of a second marked advertisement, a second encoded permission key;
      unscrambling, by the client device, a permission key associated with the second encoded permission key using the next scrambling key; and
      playing, by the client device, a subsequent portion of the content using the unscrambled permission key.

8. The method of claim 7, wherein the client processor on the client device further performs steps comprising:
   performing a heartbeat analysis while the content or advertisements is playing, the heartbeat analysis comprising:
      determining a start time and an end time for each advertisement;
      determining a content play time (CT) and a real-time (RT);
      determining whether the CT is greater than about the RT, and the CT is greater than about the start time of an advertisement;
      based on the determination that the CT is greater than about the RT, and the CT is greater than about the start time of the advertisement, detecting an attempt to avoid playing of the advertisement and inhibiting playing of the content;
      determining whether the CT is greater than about the RT, and the RT is between about the start time and end time for the advertisement; and
      based on the determination that the CT is greater than about the RT, and the RT is between about the start time and end time for the advertisement, detecting an attempt to avoid playing of the advertisement and inhibiting playing of the content.

9. A client device for use in managing viewing of advertisements within content, the client device comprising:
   a processor; and
   a non-transitory memory storing instructions that when executed by the processor cause the processor to perform steps comprising:
      receiving a downloadable client component from a server, the server performing steps comprising:
         employing a different scrambling key to scramble each of at least two permission keys;
         generating at least two encoded permission keys by combining each scrambled permission key with a next scrambling key;
         marking different portions of at least two advertisements based on different ones of the at least two encoded permission keys;
         partitioning the content into portions of content separated by at least one of the marked advertisements;
         providing the partitioned content to the client device with the marked advertisements; and
         providing the downloadable client component to the client device; and
      executing the downloadable client component on the client device to perform steps comprising:
         receiving the partitioned content with the marked advertisements;
         obtaining a first encoded permission key during playing of a first marked advertisement;
         extracting the next scrambling key from the first encoded permission key;
         obtaining, during the playing of a second marked advertisement, a second encoded permission key;
         unscrambling a permission key associated with the second encoded permission key using the next scrambling key; and
         playing a subsequent portion of the content using the unscrambled permission key.

10. The method of claim 7, wherein marking different portions comprises:
   partitioning each permission key into a plurality of partitions;
   associating each partition within the plurality of partitions for a given encoded permission key to a marker; and
   inserting the markers for the given encoded permission key at randomly selected locations throughout an advertisement.

11. The method of claim 7, wherein scrambling a permission key comprises:
   partitioning a respective permission key into a plurality of digits; and
   employing the scrambling key to re-locate the plurality of digits within the permission key;
   wherein combining the scrambled permission key with the next scrambling key further comprises combining the scrambled plurality of digits with the next scrambling key using a reversible process allowing the next scrambling key to be obtained from the encoded permission key.

12. The method of claim 7, further comprising:
selecting each scrambling key such that each bit within a given scrambling key identifies a location within a given permission key in which to re-locate bits from a first location to the location, the first location being identified by a location of each bit within the given scrambling key.

13. The method of claim 7, wherein playing of a subsequent portion of the content using the unscrambled permission key comprises:
determining whether the unscrambled permission key and an original copy of the respective permission key are equal;
based on a determination that the unscrambled permission key and the original copy of the respective permission key are equal, enabling the subsequent portion of the content to play; and
based on a determination that the unscrambled permission key and the original copy of the respective permission key are not equal, inhibiting playing of the subsequent portion of the content.

14. The client device of claim 9, the non-transitory memory further storing instructions that when executed by the processor cause the processor to perform steps comprising:
performing a heartbeat analysis while the content or advertisements is playing, the heartbeat analysis comprising:
determining a start time and end time for each advertisement;
determining a content play time (CT) and a real-time (RT);
determining whether the CT is greater than about the RT, and the CT is greater than about the start time of an advertisement;
based on the determination that the CT is greater than about the RT, and the CT is greater than about the start time of the advertisement, detecting an attempt to avoid playing of the advertisement and inhibiting playing of the content;
determining whether the CT is greater than about the RT, and the RT is between about the start time and end time for the advertisement; and
based on the determination that the CT is greater than about the RT, and the RT is between about the start time and end time for the advertisement, detecting an attempt to avoid playing of the advertisement and inhibiting playing of the content.

15. The client device of claim 9, wherein the instructions for marking different portions comprise instructions stored in the non-transitory memory that when executed by the processor cause the processor to perform steps comprising:
partitioning each permission key into a plurality of partitions;
associating each partition within the plurality of partitions for a given encoded permission key to a marker; and
inserting the markers for the given encoded permission key at randomly selected locations throughout an advertisement.

16. The client device of claim 9, wherein the instructions for scrambling a permission key comprise instructions stored in the non-transitory memory that when executed by the processor cause the processor to perform steps comprising:
partitioning a respective permission key into a plurality of digits; and
employing the scrambling key to re-locate the plurality of digits within the permission key;
wherein combining the scrambled permission key with the next scrambling key further comprises combining the scrambled plurality of digits with the next scrambling key using a reversible process allowing the next scrambling key to be obtained from the encoded permission key.

17. The client device of claim 9, the non-transitory memory further storing instructions that when executed by the processor cause the processor to perform steps comprising:
selecting each scrambling key such that each bit within a given scrambling key identifies a location within a given permission key in which to re-locate bits from a first location to the location, the first location being identified by a location of each bit within the given scrambling key.

18. The client device of claim 9, wherein the instructions for playing a subsequent portion of the content using the unscrambled permission key comprise instructions stored in the non-transitory memory that when executed by the processor cause the processor to perform steps comprising:
determining whether the unscrambled permission key and an original copy of the respective permission key are equal;
based on a determination that the unscrambled permission key and the original copy of the respective permission key are equal, enabling the subsequent portion of the content to play; and
based on a determination that the unscrambled permission key and the original copy of the respective permission key are not equal, inhibiting playing of the subsequent portion of the content.

* * * * *